United States Patent Office 2,739,930
Patented Mar. 27, 1956

2,739,930

METHOD FOR THE PURIFICATION OF ACRYLONITRILE

Marcel Borrel, Pierre-Benite, France, assignor to Societe Industrielle des Derives de l'Acetylene (S. I. D. A.), Paris, France, a corporation of France No Drawing. Application March 16, 1954, Serial No. 416,710

Claims priority, application France March 25, 1953

8 Claims. (Cl. 202—57)

The present invention concerns a method for the purification of raw acrylonitrile obtained by synthesis. It concerns more especially the selective transformation of certain impurities which are difficult to eliminate by usual means, particularly those of the acetylene polymer type such as, for instance, divinylacetylene, into compounds which are easily separable by these same means.

It is known, indeed, that during the synthesis of acrylonitrile, particularly when starting from acetylene and hydrocyanic acid by passing these compounds through a liquid catalyst based on cuprous halides and alkaline halides, there is formed, in addition to acrylonitrile, acetylenic polymers such as monovinylacetylene, divinylacetylene, and octatrienynes.

The monovinylacetylene can be easily eliminated by a fractional distillation; the same holds for octatrienynes or other higher polymers of acetylene. On the other hand, trimers of acetylene, such as, for instance, divinylacetylene, have boiling points very close to that of acrylonitrile, which renders its segregation by fractional distillation extremely difficult.

On the other hand, it is known that divinylacetylene, even at very low ratios, is particularly troublesome as it causes the instability of the monomer acrylonitrile and it affects the properties of the polymerization and copolymerization products which are to be prepared thereafter. The separation by distillation of the divinylacetylene from the acrylonitrile is made all the more difficult as it forms with the latter an azeotrope with a boiling point close to that of acrylonitrile and divinylacetylene, and containing 3 to 5% of divinylacetylene, i. e. a proportion of the same order of magnitude as that contained in the unpurified acrylonitrile.

Chemical methods have been proposed for destroying divinylacetylene either as it is formed during the synthesis of the acrylonitrile or more simply, in the midst of the raw acrylonitrile. To this effect the action of the halogens, sulphuric acid and others have been considered with more or less advantage.

On the other hand, it is known that nitrosyl chloride, NOCl, is capable of reacting with the double or triple carbon-carbon-links providing, by addition, nitrosochlorinated compounds, generally stable and presenting boiling points higher than those of the initial compounds. Now it has been found in accordance with the present invention, that when nitrosyl chloride is introduced into a medium containing acrylonitrile, divinylacetylene and other polymers of acetylene, the nitrosyl chloride offers a selective affinity for divinylacetylene and other polymers and that the acrylonitrile remains intact as long as the medium contains a ponderable amount of said polymers still untransformed.

The object of the present invention is a method for purifying acrylonitrile, which applies this selective property of nitrosyl chloride to the transformation of impurities, capable of being transformed, into nitrosochlorinated derivatives separable by distillation. This method fundamentally consists in adding to the raw acrylonitrile a sufficient amount of nitrosyl chloride for transforming the impurities to be eliminated by a selective action into stable nitrosochlorinated derivatives with boiling points higher than that of acrylonitrile, after which the acrylonitrile thus treated is distilled for separating said nitrosochlorinated derivatives.

According to a preferred embodiment of the invention, the nitro-chlorination may be effected at a temperature close to the ordinary temperature, although the reaction may also take place at a higher or at a lower temperature. To this effect, the nitrosyl chloride may be gradually introduced, in a gaseous condition, under the surface of the acrylonitrile contained in the receiver, while the reaction medium is being stirred; this prevents an excessive local heating and the fixation of nitrosyl chloride on acrylonitrile is thus limited to a minimum.

According to another embodiment of the invention, liquid nitrosyl chloride is introduced under the surface of the acrylonitrile contained in a container provided with a stirrer.

In both cases, the treatment for the purification of acrylonitrile is limited to a particularly simple operation, since it consists practically either in a bubbling at room temperature of gaseous nitrosyl chloride, prepared in advance or as it is being used or in an addition of liquid nitrosyl chloride in the acrylonitrile which also is in a liquid condition.

It is recommended to introduce the nitrosyl chloride into the acrylonitrile previously dried and before its distillation but this requires no additional operation, as it is necessary, in any case, to dry the acrylonitrile before proceeding with its distillation, which is also an indispensable operation in all cases.

Furthermore, the nitrosyl chloride may be made to act on the raw acrylonitrile, either on successive batches of acrylonitrile or in a continuous manner in a container continuously fed with raw product and from which the purified product is drawn.

When the necessary proportion of nitrosyl chloride has been introduced, the supply of this reagent is cut off and the reaction mixture containing the product of the nitrosochlorination is neutralized by an excess of alkaline reagent, such as, for instance, acid sodium carbonate, ammonia gas or an ammonia solution, so as to eliminate the acidity which may have occurred for instance due to a partial electrolysis of the nitrosyl chloride under the action of water traces contained in the raw acrylonitrile from which the operation started. The neutralizing operation after treatment by the nitrosyl chloride is not indispensable, but it is recommended for avoiding acrylonitrile losses due to secondary reactions and to the corrosion in the apparatus. The acrylonitrile may then be subjected to a decantation and/or to a filtration of the solid products then rectified by distillation for obtaining a pure product.

In order to prevent disturbing reactions there may be added if desired, to the acrylonitrile a polmerization inhibitor such as hydroquinone, for instance, at any stage of the treatment.

The nitrosyl chloride may be prepared beforehand by known methods and stored in steel bottles till it is made use of. It may also be obtained in a gaseous condition at the time of use by the very simple method which consists in passing vapors of nitrogen dioxide through a container filled with potassium chloride, according to a known method.

Owing to the transformation of the troublesome impurities into nitrosochlorinated derivatives, the process according to the present invention makes it possible to lower, in one single operation of distillation, the contents in divinylacetylene and other polymers to such a value that they are no longer detrimental to the use of acrylonitrile. This content my reach 0.05% to 0.0001% according to the amount of nitrosyl chloride used.

The property of selective fixation of the nitrosyl chloride on the impurities rather than on the acrylonitrile proper is explained by the fact that the ratio of the speed of addition on ethylene or acetylene impurities to the speed of addition on acrylonitrile is very high. Thus there may be found, in the purified product, almost the entirety of the acrylonitrile involved.

The operations of purification proper of the acrylonitrile are made particularly simple and efficient, owing to the fact that the products of nitrosochlorination of divinylacetylene and other similar derivatives have such a stability that they do not release any decomposition products during the distillation.

There is thus avoided, on the one hand, the corrosive action on the equipment which such products might have, and, on the other hand, the contamination of acrylonitrile by decomposition products.

The proposed process offers numerous advantages over prior processes and particularly over the process which would consist in causing an action of chlorine or another halogen.

A first advantage is the specially remarkable selectivity of the treatment by the nitrosyl chloride. When using chlorine, a certain amount thereof always reacts on acrylonitrile itself, thus causing a decrease in the yield. On the contrary, the nitrosyl chloride does not react on the acrylonitrile till all reactive impurities have been used up.

Another advantage is the total destruction of acetaldehyde. This compound is detrimental, as it modifies the development of the polymerization of acrylonitrile. Due to its volatility it may easily be elminated at the beginning of the distillation operation. The acrylonitrile however generally contains some lactonitrile which is poorly volatile but which is dissociated into hydrocyanic acid and acetaldehyde during the distillation of acrylonitrile. When cold, the two products of the dissociation may recombine and if a new distillation is effected, the same phenomenon is repeated, so that acrylonitrile, even if carefully rectified, most often contains these two impurities. Now it was found that contrarily to what happens with chlorine, nitrosyl chloride reacts on acetaldehyde till the last traces thereof have been removed, and this also before starting reacting on acrylonitrile.

A last advantage is the remarkable quality of the acrylonitrile purified by this method. This advantage appears on at least three points with respect to the acrylonitrile purified by chlorine:

1. The transparence in ultra-violet is greater, which indicates a more complete elimination of heavily non-saturated products.

2. The acidity of the treated product is negligible, and the compounds resulting from the action of nitrosyl chloride are perfectly stable. On the contrary, when acrylonitrile has been purified by chlorine, not only does the high acidity of the medium require a careful neutralization, but, in addition, there remain unstable chlorinated compounds which, during storing or during distillation, release hydrochloric acid. Thus, the product again becomes acid, which, apart from the drawbacks of corrosion, makes it necessary to again neutralize it.

3. The acrylonitrile treated with nitrosyl chloride is much less sensitive to polymerization during distillation operations. This helps in obtaining an excellent yield in purified acrylonitrile. It is remarkable that, on the other hand, this acrylonitrile offers, after being distilled, excellent qualities with regard to controlled polymerization when it is caused to act according to usual methods in the preparation of polymers or copolymers.

For a better illustration of the invention, a few numerical examples of an application are given hereinafter.

*Example 1*

100 cm.³ (about 80 g.) of acrylonitrile containing acetylenic impurities, and, in particular 0.5% in weight of divinylacetylene, were stirred at ordinary temperature in a 3 branch reaction container provided with a thermometer, a condenser and a stirrer. Gaseous nitrosyl chloride is slowly supplied, keeping the temperature in the vicinity of ordinary temperature. The operation was stopped after 2 g. of nitrosyl chloride had been introduced, then a neutralization was effected with solid sodium bicarbonate until a sample of acrylonitrile diluted in distilled water indicated a pH close to 4–5. Then one decanted and filtered and the acrylonitrile was distilled. The distilled acrylonitrile had a boiling point of 77.3° C. and the analysis indicated a divinylacetylene content of less than 0.001% in weight.

*Example 2*

The same proportions of reagents were treated in the same manner as in Example 1, but no neutralization was effected and the product treated with distilled directly without being filtered. The final product then contained 0.04% in weight of divinylacetylene.

*Example 3*

100 cm.³ (about 80 g.) of acrylonitrile containing 0.5% in weight of divinylacetylene were treated at a temperature of 50° C. by 2 g. of nitrosyl chloride; the other conditions of the operation were identical with those of Example 1. The distilled acrylonitrile contained 0.007% of divinylacetylene.

*Example 4*

500 g. of acrylonitrile containing 0.11% in weight of divinylacetylene and 0.35% in weight of acetaldehyde, were treated with 10 g. of nitrosyl chloride in the same manner as in Example 1. The final product contained less than 0.0005% in weight of divinylacetylene and the content in acetaldehyde was lowered to less than 0.007%.

What I claim is:

1. A method for the purification of synthetic acrylonitrile containing impurities formed of acetylenic polymers, comprising the steps of adding to the raw acrylonitrile an amount of nitrosyl chloride effective to transform said impurities into stable nitrosochlorinated derivatives, and thereafter distilling said acrylonitrile to separate said acrylonitrile from said nitrosochlorinated derivatives.

2. A method for the purification of synthetic acrylonitrile containing impurities formed of acetylenic polymers, comprising the steps of adding to the raw acrylonitrile, substantially at room temperature, an amount of nitrosyl chloride effective to transform said impurities into stable nitrosochlorinated derivatives, and thereafter distilling said acrylonitrile to separate said acrylonitrile from said nitrosochlorinated derivatives.

3. A method for the purification of synthetic acrylonitrile containing impurities formed of acetylonic polymers, comprising the steps of adding to the raw acrylonitrile, while stirring, an amount of gaseous nitrosyl chloride effective to transform said impurities into stable nitrosochlorinated derivatives, and thereafter distilling said acrylonitrile to separate said acrylonitrile from said nitrosochlorinated derivatives.

4. A method for the purification of synthetic acrylonitrile containing impurities formed of acetylenic polymers, comprising the steps of adding to the raw acrylonitrile, while stirring, an amount of liquid nitrosyl chloride effective to transform said impurities into stable nitrosochlorinated derivatives, and thereafter distilling said acrylonitrile to separate said acrylonitrile from said nitrosochlorinated derivatives.

5. A method for the purification of synthetic acrylonitrile containing impurities formed of acetylenic polymers, comprising the steps of adding to the raw acrylonitrile an amount of nitrosyl chloride effective to transform said impurities into stable nitrosochlorinated derivatives, neutralizing the so obtained mixture, and thereafter distilling said acrylonitrile to separate said acrylonitrile from said nitrosochlorinated derivatives.

6. A method for the purification of synthetic acrylonitrile containing impurities formed of acetylenic polymers, comprising the steps of adding to the raw acrylonitrile an amount of nitrosyl chloride effective to transform said impurities into stable nitrosochlorinated derivatives, separating those of said nitrosochlorinated derivatives which are solid from the obtained mixture and thereafter distilling said mixture to separate said acrylonitrile from the remaining nitrosochlorinated derivatives.

7. A method for the purification of synthetic acrylonitrile containing impurities formed of acetylenic polymers, comprising the steps of adding to the raw acrylonitrile an amount of nitrosyl chloride effective to transform said impurities into stable nitrosochlorinated derivatives, and thereafter distilling said acrylonitrile to separate said acrylonitrile from said nitrosochlorinated derivatives, a polymerisation inhibitor being added to said acrylonitrile at any of said steps.

8. A method for the purification of synthetic acrylonitrile containing impurities formed of acetylenic polymers, comprising the steps of adding to the raw acrylonitrile, while stirring, an amount of nitrosyl chloride effective to transform said impurities into stable nitrosochlorinated derivatives, neutralizing the so obtained mixture, separating those of said nitrosochlorinated derivatives which are solid from the obtained mixture and thereafter distilling said mixture to separate said acrylonitrile from the remaining nitrosochlorinated derivatives.

References Cited in the file of this patent

UNITED STATES PATENTS

| | | |
|---|---|---|
| 2,471,928 | Bortnick et al. | May 31, 1949 |
| 2,683,163 | Nichols | July 6, 1954 |